US009816162B2

(12) United States Patent
Mikaki et al.

(10) Patent No.: US 9,816,162 B2
(45) Date of Patent: Nov. 14, 2017

(54) COMPONENT, AND WATCH, PORTABLE TERMINAL, AND PERSONAL ORNAMENT USING THE SAME

(71) Applicant: KYOCERA Corporation, Kyoto-shi, Kyoto (JP)

(72) Inventors: Shunji Mikaki, Kyoto (JP); Akihiro Hanai, Kyoto (JP); Minoru Nakasuga, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 14/915,165

(22) PCT Filed: Aug. 29, 2014

(86) PCT No.: PCT/JP2014/072751
§ 371 (c)(1),
(2) Date: Feb. 26, 2016

(87) PCT Pub. No.: WO2015/030179
PCT Pub. Date: Mar. 5, 2015

(65) Prior Publication Data

US 2016/0208366 A1 Jul. 21, 2016

(30) Foreign Application Priority Data

Aug. 30, 2013 (JP) ................................ 2013-179857

(51) Int. Cl.
*C04B 35/58* (2006.01)
*G04B 37/22* (2006.01)
*C22C 29/16* (2006.01)
*C22C 1/05* (2006.01)

(52) U.S. Cl.
CPC .............. *C22C 29/16* (2013.01); *C22C 1/053* (2013.01); *G04B 37/22* (2013.01)

(58) Field of Classification Search
CPC ..... C03B 35/58014; C22C 9/16; C22C 29/16; C04B 35/58014; G04B 37/22
See application file for complete search history.

(56) References Cited

U.S. PATENT DOCUMENTS

2010/0331167 A1 12/2010 Ohta et al.
2011/0104404 A1* 5/2011 Hamamura ............ A01K 87/04 428/31
2012/0115706 A1* 5/2012 Ohta ...................... A63B 53/00 501/1

FOREIGN PATENT DOCUMENTS

EP 1767661 * 3/2007
EP 2 226 404 A1 9/2010
EP 2298948 A1 3/2011
EP 2 423 343 A1 2/2012
JP 2011153347 * 8/2011

(Continued)

OTHER PUBLICATIONS

International Search Report issued by Japan Patent Office for International Application No. PCT/JP2014/072751.

(Continued)

*Primary Examiner* — Karl Group
(74) *Attorney, Agent, or Firm* — Procopio Cory Hargreaves and Savitch LLP

(57) ABSTRACT

An ornamental component has an ornamental face, and includes a titanium nitride sintered body containing nickel and niobium, and the titanium nitride sintered body contains a compound including nickel, niobium and titanium.

7 Claims, 2 Drawing Sheets

(56) References Cited

FOREIGN PATENT DOCUMENTS

| | | | |
|---|---|---|---|
| WO | 2009-069549 A1 | | 6/2009 |
| WO | 2009-145146 A1 | | 12/2009 |
| WO | 2010050493 | * | 5/2010 |

OTHER PUBLICATIONS

Written Opinion of the International Searching Authority issued by Japan Patent Office for International Application No. PCT/JP2014/072751.

Extended European Search Report dated Apr. 10, 2017, issued by the European Patent Office in counterpart European Patent Application No. 14 83 9891.0.

* cited by examiner (a)

(b)

COMPONENT, AND WATCH, PORTABLE TERMINAL, AND PERSONAL ORNAMENT USING THE SAME

TECHNICAL FIELD

The present invention relates to a gold-colored ornamental component, and a watch, a portable terminal and a personal ornament using the same.

BACKGROUND ART

As a gold-colored ornamental component, heretofore it has been customary to use gold, a gold alloy, or gold-plated metal of various types from a color tone or corrosion resistance standpoint. However, each of gold, a gold alloy, and a gold-plated metal material has low hardness, and is thus susceptible to surface flaw or deformation upon contact with a hard substance.

Moreover, due to the increasing variety of customer's preferences, there arises a demand for gold colors having different hues. To solve the above-mentioned problem, as well as to meet such a customer's request, the applicant of the present application has proposed gold-colored ceramics of various types to date.

An example of ceramic products proposed by the applicants is ceramics for ornamental component which is made of a titanium nitride sintered body predominantly composed of titanium nitride, and contains nickel, niobium, chromium, and carbon, and in which the carbon is contained in an amount of greater than or equal to 0.5 mass % but less than or equal to 0.9 mass % (refer to Patent Literature 1).

Another example is ceramics for ornamental component which is made of a titanium nitride sintered body and contains nickel, niobium, chromium, and carbon, and in which the carbon is contained in an amount of greater than or equal to 1 mass % but less than or equal to 2 mass % (refer to Patent Literature 2).

CITATION LIST

Patent Literature 1: WO 2009/069549
Patent Literature 2: WO 2009/145146

SUMMARY OF INVENTION

Technical Problem

The ceramics for ornamental component described in Patent Literatures 1 and 2 takes on a gold color and has high hardness, and is thus capable of solving the above-mentioned problem and keeping up with the increasing variety of customer's preferences. However, metals such as nickel, niobium, and chromium contained in the ceramics for ornamental component described in Patent Literatures 1 and 2 have ductility, and therefore adhere easily to a grindstone during shaping working operation, thus causing clogging of the grindstone with consequent prolonged working time. Thus, the shortening of working time is sought after.

The invention has been devised to fulfill the requirements as mentioned above, and accordingly an object of the invention is to provide an ornamental component made of gold-colored ceramics and having excellent workability of a sintered body into a desired shape, and a watch, a portable terminal, and a personal ornament using the ornamental component.

Solution to Problem

The invention provides an ornamental component having an ornamental face, comprising a titanium nitride sintered body containing nickel and niobium, the titanium nitride sintered body containing a compound comprising nickel, niobium and titanium.

The invention provides a watch, a portable terminal, and a personal ornament, comprising the ornamental component.

Advantageous Effects of Invention

According to the ornamental component of the invention, it is possible to obtain an ornamental component which is made of gold-colored ceramics, has excellent workability of a sintered body into a desired shape, and has a glossy, high-quality ornamental face.

The watch, the portable terminal, and the personal ornament according to the invention afford a tasteful high-class appearance and an aesthetically pleasing image that appeal to customers.

DESCRIPTION OF EMBODIMENTS

Figure 1:
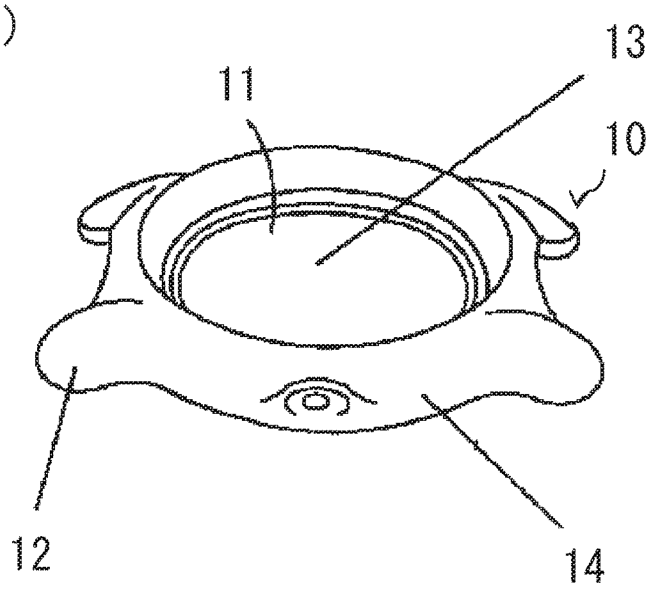
FIG. 1(*a*) is a perspective view of a watch case implemented as an example of the ornamental component of the present embodiment, as seen from the front side, and FIG. 1(*b*) is a perspective view of the watch case as seen from the back side.
Figure 1:
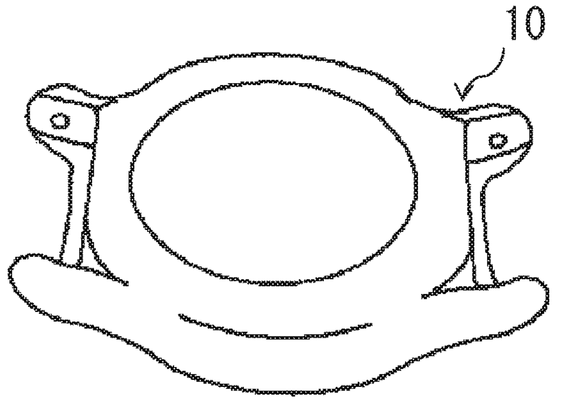

The following describes an embodiment of an ornamental component according to the invention.

The ornamental component of the present embodiment has an ornamental face, and comprises a titanium nitride sintered body containing nickel and niobium, and the titanium nitride sintered body includes a compound comprising nickel, niobium and titanium. The presence of the compound comprising nickel, niobium and titanium in the titanium nitride sintered body makes it possible to shorten the time taken for the working of an ornamental component into a desired shape. This is because, in contrast to a case where the whole of nickel and niobium is present as ductile metal in the titanium nitride sintered body, in the above case where at least part of nickel and niobium is present as a brittle compound in the titanium nitride sintered body, it is possible to reduce adhesion of these constituent elements to a grindstone during the shaping operation, and thereby render a grindstone resistant to clogging.

Moreover, by virtue of the presence of the compound comprising nickel, niobium and titanium in the titanium nitride sintered body, although a reason why the presence is so effective is not fully clarified, the glossy, high-quality ornamental face is achieved, which provides a high-class appearance and an aesthetically pleasing image that appeal to customers.

As used herein, the term "ornamental face" refers to a face of the ornamental component that is required to have an ornamental value, and has an arithmetic mean surface roughness Ra of less than or equal to 0.03 μm in a roughness curve for the ornamental face. The arithmetic mean surface roughness Ra in the ornamental face roughness curve is defined as the average of values measured at five points, respectively, of the face by stylus surface-roughness meter in conformance with JIS B 0601-2001 under conditions of measurement length of 5 mm, cutoff value of 0.8 mm, stylus tip radius of 2 μm, and stylus scanning rate of 0.5 mm/sec.

Moreover, the titanium nitride sintered body is of a sintered body in which titanium nitride exhibits the highest peak intensity at diffraction angles 2θ ranging from 20° to 80° in measurement under Cu-Kα radiation effected by X-ray diffractometer (XRD, for example, D8 ADVANCE manufactured by Bruker AXS corporation), and the content of titanium nitride is greater than or equal to 50 mass % based on the total mass of all the constituents of the titanium nitride sintered body defined as 100 mass %. The content of titanium nitride is determined by analyzing the data obtained by measurement using XRD in accordance with Rietvelt analytical method.

Moreover, as for the amounts of nickel and niobium to be contained, for example, a nickel (Ni) content is greater than or equal to 7.0 mass % but less than or equal to 13.0 mass %, and a niobium (Nb) content is greater than or equal to 2.5 mass % but less than or equal to 7.0 mass %, based on the total mass of all the constituents of the titanium nitride sintered body defined as 100 mass %.

Moreover, the presence of the compound comprising nickel, niobium and titanium may be determined by identification under measurement using XRD. For example, the compound comprising nickel, niobium and titanium is a compound which is expressed as $Nb_{0.125}Ni_{0.75}Ti_{0.125}$, and, JCPDS No. of $Nb_{0.125}Ni_{0.75}Ti_{0.125}$ is 01-171-9893. The peak of TiN appears at 2θ in the vicinity of 42.4°, and, the peak of $Nb_{0.125}Ni_{0.75}Ti_{0.125}$ appears at 2θ in the vicinity of 46.2°.

Moreover, it is preferable that the ornamental component of the present embodiment contains free carbon in an amount of greater than or equal to 0.5 mass % but less than or equal to 1.2 mass % based on the total mass of all the constituents of the titanium nitride sintered body defined as 100 mass %. Fulfillment of such a condition makes it possible to achieve further shortening of the working time to obtain an ornamental component of desired shape while maintaining mechanical characteristics.

Moreover, in the ornamental component of the present embodiment, it is preferable that the titanium nitride sintered body contains chromium, and contains a compound comprising nickel and chromium. The presence of the compound comprising nickel and chromium makes it possible to achieve still further shortening of the working time to obtain an ornamental component of desired shape. Furthermore, nickel and chromium are magnetic substances, whereas the compound comprising nickel and chromium is a non-magnetic substance. Thus, a watch, a portable terminal, or other article using this ornamental component is impervious to magnetic influence.

The presence of the compound comprising nickel and chromium may be determined by identification under measurement using XRD. Moreover, the compound comprising nickel and chromium is a compound which is expressed as CrNi, and, JCPDS No. of CrNi is 01-071-7594.

Moreover, in the ornamental component of the present embodiment, it is preferable that the compound identified by measurement using XRD is made of TiN, $Nb_{0.125}Ni_{0.75}Ti_{0.125}$, and CrNi. When the compound identified by measurement using XRD is made of TiN, $Nb_{0.125}Ni_{0.75}Ti_{0.125}$, and CrNi, the working time to obtain an ornamental component of desired shape can be shortened even further. Although the identified compound is a target compound, as a matter of course, another component or compound may be contained in the ornamental component to a limited extent that would not be positively identified.

Moreover, in the ornamental component of the present embodiment, it is preferable that, with reference to CIE 1976 L*a*b* color space, the ornamental face has a lightness index L* of greater than or equal to 65 but less than or equal to 71, a chromaticness index a* of greater than or equal to 4 but less than or equal to 8, and a chromaticness index b* of greater than or equal to 4 but less than or equal to 20. The ornamental face which fulfills the above specified ranges has a gold color having a pink hue, and thus has a glossy texture and a tasteful high-class appearance, which gives customers an aesthetically pleasing image.

The values of the lightness index L* and the chromaticness indices a* and b* of the ornamental face according to CIE 1976 L*a*b* color space are determined by measurement in conformance with JIS Z 8722-2000. For example, the measurement may be conducted with spectrophotometric colorimeter (for example, Model CM-3700A manufactured by Konica Minolta, Inc.) under conditions where SCI (Specular Component Included) method is adopted for measurement, CIE standard illuminant D65 is used as a light source; an angular field of view is set at 10°; and the range of measurement is 3 mm×5 mm.

To obtain an ornamental component having the above-mentioned pinkish gold color, its composition is adjusted so that, based on the total mass of all the constituents of the titanium nitride sintered body defined as 100 mass %, the content of nickel is greater than or equal to 7.0 mass % but less than or equal to 13.0 mass %, the content of niobium is greater than or equal to 2.5 mass % but less than or equal to 7.0 mass %, and the balance is titanium nitride. When chromium is contained in the titanium nitride sintered body, the composition is adjusted so that the content of chromium is greater than or equal to 1.5 mass % but less than or equal to 4.0 mass %, and the balance is titanium nitride.

Moreover, the ornamental component of pinkish gold color that satisfies the aforestated compositional requirement has a three-point bending strength of greater than or equal to 1000 MPa and a Hv hardness of greater than or equal to 12 GPa, and thus affords satisfactory mechanical characteristics from a workable standpoint, is flaw-proof, and is resistant to deformation. The three-point bending strength may be determined by measurement in conformance with JIS R 1601-2008, and the Hv hardness may be determined by measurement in conformance with JIS R 1610-2003.

Moreover, it is preferable that in the ornamental component of the present embodiment, the titanium nitride sintered body includes at least one of molybdenum, tungsten and cobalt. At least one of molybdenum, tungsten and cobalt contained in the titanium nitride sintered body serves as a sintering aid, thus achieving the lowering of firing temperature. This helps prevent deterioration in workability in the shaping of the ornamental component caused by abnormal grain growth in titanium nitride crystals.

As a matter of course, the ornamental component may be designed to contain all of molybdenum, tungsten and cobalt. In this case, for example, based on the total mass of all the constituents of the titanium nitride sintered body defined as 100 mass %, molybdenum (Mo) is preferably contained in an amount of greater than or equal to 0.5 mass % but less than or equal to 2.0 mass %, tungsten (W) is preferably contained in an amount of greater than or equal to 0.05 mass % but less than or equal to 0.4 mass %, and cobalt (Co) is preferably contained in an amount of greater than or equal to 0.02 mass % but less than or equal to 0.2 mass %.

The contents of nickel, niobium, chromium, molybdenum, tungsten and cobalt based on the total mass of all the constituents of the titanium nitride sintered body defined as 100 mass % are determined by measurement on Ni, Nb, Cr, Mo, W, and Co using an ICP (Inductively Coupled Plasma) emission spectrophotometer or an fluorescent X-ray analyzer. Note that, in free carbon measurement, sintered titanium nitride powder is analyzed by a carbon analyzer (for example, Model RC-612 manufactured by LECO CORPORATION). Measurement values are based on a calibration curve drawn for a reference sample (calcium carbonate), and, the correctness of the calibration curve may be verified by measuring silicon carbide powder whose free carbon content has already been determined.

Next, specific examples of the ornamental component of the present embodiment will be described.

FIG. 1(*a*) is a perspective view of a watch case implemented as an example of the ornamental component of the present embodiment, as seen from the front side, and FIG. 1(*b*) is a perspective view of the watch case as seen from the back side. Moreover, FIG. 2 is a schematic diagram showing the structure of a watch bracelet implemented as an example of the ornamental component of the present embodiment.

The watch case 10 shown in FIGS. 1(*a*) and 1(*b*) comprises a recess 11 for storing a non-illustrated movement (driving mechanism) and so forth, and leg portions 12 for securing a watch bracelet (not shown in the drawing) for wearing a watch on user's wrist. The recess 11 comprises a thin bottom portion 13 and a thick body portion 14.

Figure 2:
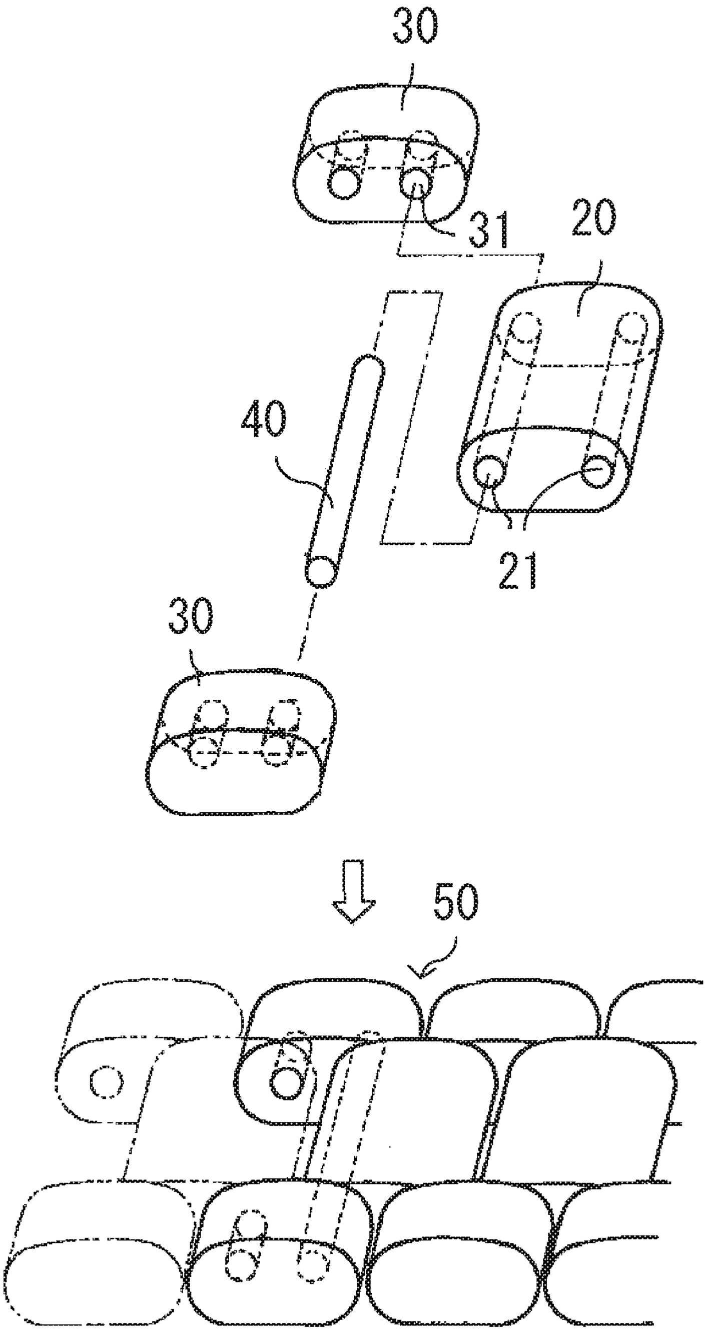
FIG. 2 is a schematic diagram showing the structure of a watch bracelet implemented as an example of the ornamental component of the present embodiment.

Bracelet parts constituting the watch bracelet 50 shown in FIG. 2 include a mid piece part 20 having a through hole 21 into which a pin 40 is inserted, and outer piece parts 30 arranged with the mid piece part 20 lying between them, each having a pin receiving hole 31 into which each end of the pin 40 is inserted. The pin 40 is inserted into the through hole 21 of the mid piece part 20, and each end of the inserted pin 40 is received by the pin receiving hole 31 of the outer piece part 30, whereupon the mid piece part 20 and the outer piece parts 30 are joined together in orderly sequence, thus constituting the watch bracelet 50.

The watch case 10 and the bracelet parts constituting the watch bracelet 50 are each constructed of the ornamental component of the present embodiment, and thus have a glossy texture and a tasteful high-class appearance, which gives customers an aesthetically pleasing image.

Also, a watch composed of the ornamental components of the present embodiment in the form of such watch case 10 and bracelet parts constituting the watch bracelet 50 has a glossy texture and a tasteful high-class appearance, which gives customers an aesthetically pleasing image. Note that the ornamental component of the present embodiment is applicable to clock hands or a clock face.

Moreover, the ornamental component of the present embodiment is suited for an enclosure, various operation keys, etc. of a portable terminal. An owner of a portable terminal using the ornamental component of the present embodiment enjoys its aesthetically pleasing image backed by a glossy texture and a tasteful high-class appearance. Note that, for example, the portable terminal refers to handheld information terminals including mobile phones, portable car navigation systems, and portable audio players.

Furthermore, the ornamental component of the present embodiment is suited for finger rings, earrings, necklaces, and the like. An owner of such a personal ornament using the ornamental component of the present embodiment enjoys its aesthetically pleasing image backed by a glossy texture and a tasteful high-class appearance.

The application of the ornamental component of the present embodiment is not limited to the above-mentioned articles, and is also suited for other articles required to have an ornamental value, such as amenities and car emblems.

The following describes an example of a method for manufacturing the ornamental component of the present embodiment.

To begin with, predetermined amounts of titanium nitride powder having an average particle diameter of 10 to 30 μm, titanium carbide powder having an average particle diameter of 0.5 to 3.0 μm, nickel powder having an average particle diameter of 10 to 20 μm, and niobium powder having an average particle diameter of 20 to 50 μm are weighed out. Specifically, the weighing is conducted to prepare a starting material having a composition of 7.0 to 13.0 mass % nickel powder, 2.5 to 7.5 mass % niobium powder, the balance being the titanium carbide powder and the titanium nitride powder in a ratio of 1:1.48 to 9.25. The starting material and water or methanol used as a solvent are put in a mill for mixing and pulverization. It is preferable that the ratio of the titanium carbide powder to the titanium nitride powder is 1:2.4 to 4.1 from the viewpoint of shaping workability and color tone.

Moreover, when the titanium nitride sintered body contains at least one of chromium, molybdenum, tungsten and cobalt, chromium powder, molybdenum powder, tungsten powder and cobalt powder are prepared to be added to the starting material.

The reason for the use of titanium carbide powder as the starting material is that a compound made of nickel, niobium, and titanium can be produced by mixing and pulverizing titanium carbide powder having a relatively small average particle diameter and nickel powder and niobium powder having a relatively large average particle diameter over 10 or more hours, and whereafter mixing the mixture and titanium nitride powder and pulverizing them as a secondary mixing-pulverizing step. According to the method of manufacturing the ornamental component of the present embodiment, although titanium carbide powder is used, the thereby obtained sintered body in ornamental component form shows no sign of the presence of titanium carbide crystals therein. This can be ascertained by measurement using XRD.

Moreover, to achieve the presence of a compound comprising nickel and chromium, a predetermined amount of chromium powder is weighed out, and, in addition to the titanium carbide powder, the nickel powder, and the niobium powder, this chromium powder is added. In this case, the mixing and pulverizing time is 60 to 100 hours. Also in this case, after the mixing and pulverizing process, titanium nitride powder is added for a secondary mixing step.

Subsequently, a predetermined amount of binder is added to a slurry obtained by the secondary mixing step, and, the slurry is spray-dried into granules. The granules are shaped into a molded body of desired shape, for example, a circular plate, a flat plate, or a solid torus, by a desired molding technique, for example, dry pressing molding method, cold isostatic pressing molding method, or extrusion molding method. When a complex shape is imparted to the ornamental component, injection molding method may be adopted as the molding technique.

The molded body is, after being subjected to a cutting process on an as needed basis, degreased in an atmosphere of inert gas at a temperature of 310 to 390° C. and under a pressure of 30 to 60 kPa to obtain a degreased body. After that, the degreased body is placed in a ceramic-made container maintained under vacuum at 1.33 Pa or below, and is then fired at a temperature of 1200 to 1800° C. In this way, a titanium nitride sintered body is obtained.

The titanium nitride sintered body obtained is shaped into a desired form. At this time, by virtue of the presence of a compound comprising nickel, niobium and titanium therein, the working of the titanium nitride sintered body into the desired form can be accomplished in a shorter period of time.

Next, a face of the sintered body which is required to have an ornamental value is, after being lapped by a tin-made lapping machine under the supply of diamond abrasive grains having an average particle diameter of less than or equal to 1 μm for example, subjected to barrel polishing. Thus, the face becomes an ornamental face having an arithmetic mean surface roughness Ra of less than or equal to 0.03 μm in the ornamental face roughness curve, and the machined surface thereof becomes a glossy, gold-colored ornamental face. The barrel polishing is effected by operating a rotational barrel finishing machine for 24-hour rotation in accordance with wet barreling method using green carborundum (GC) as media.

The thereby obtained ornamental component of the present embodiment has adequate mechanical strength from a workable standpoint, and is thus flaw-proof and resistant to deformation. Moreover, the ornamental face thereof has a glossy texture and a tasteful high-class appearance, which gives customers an aesthetically pleasing image. The ornamental component obtained by the manufacturing method thus far described takes on a pinkish gold color.

While examples of the invention will be described hereinbelow, the present embodiment is not limited to the following examples.

Example 1

First, a starting material is prepared by weighing predetermined amounts as shown in Table 1 of titanium nitride powder having an average particle diameter of 22 μm, titanium carbide powder having an average particle diameter of 1.0 μm, nickel powder having an average particle diameter of 12 μm, and niobium powder having an average particle diameter of 33 μm. The ratio of the titanium carbide powder to the titanium nitride powder in Sample No. 1 was set at 1:3, and, titanium nitride powder was used alone for Sample No. 2. In preparing Sample No. 1, the titanium carbide powder, the nickel powder, the niobium powder, and water used as a solvent have been mixed while being pulverized in a mill for 10 hours, and then, after the addition of the titanium nitride powder, mixing and pulverizing process has been continued for 40 hours. In preparing Sample No. 2, the starting material and water used as a solvent have been mixed while being pulverized in a mill for 50 hours.

Subsequently, a predetermined amount of binder wad added to a slurry obtained by the mixing and pulverizing process, and, the slurry has been spray-dried into granules. The granules were molded under a pressure of 98 MPa to form a molded body.

After having been subjected to a cutting process, the molded body has been degreased in an atmosphere of inert gas at a temperature of 350° C. and under a pressure of 45 kPa to obtain a degreased body. After that, the degreased body was placed in a ceramic-made container maintained under vacuum at 1.33 Pa or below, and has been fired at a temperature of 1500° C. In this way, titanium nitride sintered body of Sample Nos. 1 and 2 were obtained.

Next, each sample was subjected to measurement under Cu-Kα radiation effected by XRD (D8 ADVANCE manufactured by Bruker AXS corporation) at 2θ ranging from 20° to 80°. The result of the measurement has indicated that a compound comprising nickel, niobium and titanium ($Nb_{0.125}Ni_{0.75}Ti_{0.125}$) is present in Sample No. 1. Moreover, in each sample, a compound identified at the highest peak intensity was titanium nitride. In addition, titanium carbide was not detected in Sample No. 1.

Moreover, from the result of measurement using ICP, it has been confirmed that, in each sample, the contents of Ti, Ni, and Nb conform to those in the starting material.

Then, examination was made for the grinding resistance of each sample. A surface grinder (SGE-515E2T manufactured by Nagase Integrex Co., Ltd.) equipped with a wheel (SDC400N75B25-5 manufactured by Asahi Diamond Industrial Co., Ltd.) was used for the examination. Grinding resistance was measured following the completion of 200 passes with stationary dynamometer (Type 9257B manufactured by Kistler Instrument Corporation) under conditions of rotating speed of 2000 $min^{-1}$, cutting depth of 0.005 mm/pass, and grinding amount of 1200 V ($mm^3$). Prior to the grinding operation, each sample was subjected to truing and dressing using a copper-made truing block under conditions of rotating speed of 1500 $min^{-1}$ and cutting depth of 0.005 mm/pass.

The result is shown in Table 1.

TABLE 1

| Sample No. | TiN (mass %) | TiC (mass %) | Ni (mass %) | Nb (mass %) | NiNbTi compound | Grinding resistance (N) |
|---|---|---|---|---|---|---|
| 1 | 63.7 | 21.2 | 10.4 | 4.7 | Found | 470 |
| 2 | 84.9 | 0 | 10.4 | 4.7 | Not found | 580 |

It has been understood from Table 1 that the presence of a compound comprising nickel, niobium and titanium allows enhancement in shaping workability. Note that, from the result of measurement made of the three-point bending strength and the Hv hardness of each of Sample Nos. 1 and 2 in conformance with JIS R 1601-2008 and JIS R 1610-2003, it has been found that, although Sample No. 2 is higher in the values of three-point bending strength and Hv hardness than Sample No. 1, Sample No. 1 has a three-point bending strength of 1000 MPa or above and a hardness of 12 GPa or above, and is thus capable of, while achieving enhanced shaping workability, providing mechanical characteristics of high enough level to achieve those required of an ornamental component.

The result of nitrogen content examination using a nitrogen analyzer has indicated that Sample No. 1 has a nitrogen content of 13 mass % and Sample No. 2 has a nitrogen content of 17 mass %. Although Samples No. 1 and No. 2 are each of a titanium nitride sintered body and there is thus no difference in titanium content between them, by checking the content of nitrogen, it is possible to determine whether or not the starting material for each sample is composed solely of titanium nitride powder.

Example 2

Titanium nitride sintered bodies of Sample Nos. 3 through 8 were formed basically in the same way as that for forming Sample No. 1 of Example 1, except that conditions for degreasing in firing process (degreasing temperature and degreasing time) were different. Note that Sample No. 5 was formed under the same conditions as those adopted in forming Sample No. 1.

Next, these samples were each pulverized, and, the content of free carbon in each sample was determined by measurement using a carbon analyzer (Model RC-612 manufactured by LECO CORPORATION). The content of free carbon was based on a calibration curve drawn for a reference sample (calcium carbonate), and, the correctness of the calibration curve was verified by measuring silicon carbide powder whose free carbon content had already been determined.

Then, examination was made for the grinding resistance of each sample in a manner similar to that adopted in Example 1. Moreover, test pieces were formed in conformance with JIS R 1624-2010 under the same conditions as those adopted in forming each sample for three-point bending strength measurement. The test pieces were ranked and listed in order of decreasing three-point bending strength in Table 2.

TABLE 2

| Sample No. | Free carbon (mass %) | Grinding resistance (N) | Rank order on three-point bending strength |
|---|---|---|---|
| 3 | 0.4 | 510 | 1 |
| 4 | 0.5 | 480 | 2 |
| 5 | 0.8 | 470 | 3 |
| 6 | 1 | 470 | 4 |
| 7 | 1.2 | 460 | 5 |
| 8 | 1.3 | 450 | 6 |

It has been understood from Table 2 that the content of free carbon should preferably be greater than or equal to 0.5 mass % but less than or equal to 1.2 mass % based on the total mass of all the constituents of the titanium nitride sintered body defined as 100 mass % in the interest of achieving enhancement in shaping workability while maintaining mechanical characteristics.

Example 3

Titanium nitride sintered bodies of Sample Nos. 9 through 28 were formed basically in the same way as that for forming Sample No. 1 of Example 1, except that chromium powder was prepared, starting material composition shown in Table 3 was used, and the mixing and pulverizing time was 70 hours. Note that the way for forming Sample No. 24 differs from that for forming Sample No. 1 only in the mixing and pulverizing time.

Then, each sample was subjected to measurement under Cu-Kα radiation effected by XRD (D8 ADVANCE manufactured by Bruker AXS corporation) at 2θ ranging from 20° to 80°. The result of the measurement has indicated that a compound comprising nickel, niobium and titanium ($Nb_{0.125}Ni_{0.75}Ti_{0.125}$) is present in each and every sample. Moreover, the samples excluding Samples No. 24 and No. 25 have been found to contain a compound comprising nickel and chromium (CrNi).

Next, examination was made for the grinding resistance of each sample in a manner similar to that adopted in Example 1.

Moreover, in forming each sample, after preparing a separate sintered body, an ornamental face having an arithmetic mean surface roughness Ra of less than or equal to 0.03 μm in the ornamental face roughness curve was formed by performing lapping with a tin-made lapping machine under the supply of diamond abrasive grains having an average particle diameter of less than or equal to 1 μm, followed by barrel polishing.

Then, the values of the lightness index L* and the chromaticness indices a* and b* according to CIE 1976 L*a*b* color space in each ornamental face were determined by measurement in conformance with JIS Z 8722-2000 using spectrophotometric colorimeter (Model CM-3700A manufactured by Konica Minolta, Inc.) under conditions of measurement method of SCI (Specular Component Included) method, a light source of CIE standard illuminant D65, an angular field of view of 10 degrees, and measurement range of 3 mm×5 mm. The result of the measurement is listed in Table 3.

TABLE 3

| Sample No. | TiN (mass %) | TiC (mass %) | Ni (mass %) | Nb (mass %) | Cr (mass %) | L* | a* | b* | Grinding resistance (N) |
|---|---|---|---|---|---|---|---|---|---|
| 9 | 48.0 | 34.0 | 10.1 | 4.5 | 3.4 | 64 | 3 | 3 | 340 |
| 10 | 49.0 | 33.0 | 10.1 | 4.5 | 3.4 | 65 | 4 | 4 | 340 |
| 11 | 58.6 | 24.2 | 10.1 | 4.5 | 2.6 | 66 | 5 | 10 | 350 |
| 12 | 62.1 | 20.7 | 10.1 | 4.5 | 2.6 | 67 | 7 | 13 | 370 |
| 13 | 66.7 | 16.2 | 10.1 | 4.5 | 2.5 | 69 | 8 | 16 | 390 |
| 14 | 74.0 | 8.0 | 10.1 | 4.5 | 3.4 | 71 | 8 | 20 | 410 |
| 15 | 75.0 | 7.0 | 10.1 | 4.5 | 3.4 | 72 | 9 | 21 | 410 |
| 16 | 66.2 | 20.7 | 6.1 | 4.5 | 2.5 | 68 | 3 | 15 | 390 |
| 17 | 65.2 | 20.7 | 7.0 | 4.5 | 2.6 | 68 | 4 | 14 | 390 |
| 18 | 59.1 | 20.7 | 13.0 | 4.5 | 2.7 | 66 | 8 | 13 | 350 |
| 19 | 58.1 | 20.7 | 14.0 | 4.5 | 2.7 | 65 | 9 | 12 | 350 |
| 20 | 62.1 | 23.2 | 10.1 | 2.0 | 2.6 | 65 | 6 | 3 | 370 |
| 21 | 62.1 | 22.7 | 10.1 | 2.5 | 2.6 | 65 | 6 | 4 | 370 |
| 22 | 62.1 | 18.2 | 10.1 | 7.0 | 2.6 | 68 | 7 | 20 | 370 |
| 23 | 62.1 | 17.7 | 10.1 | 7.5 | 2.6 | 68 | 7 | 21 | 370 |
| 24 | 63.7 | 21.2 | 10.4 | 4.7 | 0.0 | 67 | 7 | 13 | 470 |
| 25 | 63.0 | 21.0 | 10.3 | 4.7 | 1.0 | 67 | 7 | 13 | 460 |
| 26 | 62.8 | 20.9 | 10.2 | 4.6 | 1.5 | 67 | 7 | 13 | 370 |
| 27 | 61.1 | 20.4 | 10.0 | 4.5 | 4.0 | 65 | 7 | 13 | 370 |
| 28 | 60.5 | 20.1 | 9.9 | 4.5 | 5.0 | 64 | 5 | 11 | 360 |

It has been understood from Table 3 that the presence of a compound comprising nickel and chromium in the titanium nitride sintered body allows further enhancement in shaping workability.

In each of Sample Nos. 10 through 14, 17, 18, 21, 22, and 24 through 27, its ornamental face has a lightness index L* of greater than or equal to 65 but less than or equal to 71, a chromaticness index a* of greater than or equal to 4 but less than or equal to 8, and a chromaticness index b* of greater than or equal to 4 but less than or equal to 20 according to CIE 1976 L*a*b* color space, and, it takes on a pinkish gold color and has a glossy texture and a tasteful high-class appearance, which provides an aesthetically pleasing image.

Moreover, as to chromium, in Sample No. 25 having a chromium content of 1 mass %, a compound comprising nickel and chromium was not detected, and, in Sample No. 28 having a chromium content of 5 mass %, a decrease in lightness index was observed. It has thus been understood that the content of chromium should preferably be greater than or equal to 1.5 mass % but less than or equal to 4.0 mass % in the interest of achieving enhancement in shaping workability while attaining the above-mentioned color tone.

Example 4

In forming another sample, molybdenum powder, tungsten powder and cobalt powder were prepared, and, a change was made to the starting material composition in Sample No. 1 of Example 1 so that, with a reduction of 1 mass % of titanium carbide powder, each of the molybdenum powder, the tungsten powder, and the cobalt powder was added correspondingly. These samples were formed basically in the same way as that for forming Sample No. 1 of Example 1, except for the starting material composition. Sample No. 1 of Example 1 was also prepared for purposes of comparison.

Then, examination was made for the relative density of each sample obtained. The relative density was determined by measuring the apparent density of the titanium nitride sintered body in conformance with JIS R 1634-1998, and then dividing the apparent density by the theoretical density of the titanium nitride sintered body. The result of the examination has indicated that the samples containing the molybdenum powder, the tungsten powder, and the cobalt powder, respectively, are higher in relative density than Sample No. 1, wherefore the presence of at least one of molybdenum, tungsten and cobalt in the titanium nitride sintered body allows the lowering of firing temperature. Moreover, it has been found that the lowering of firing temperature helps prevent deterioration in shaping workability caused by abnormal grain growth in titanium nitride.

REFERENCE SIGNS LIST

10: Watch case
11: Recess
12: Leg portion
13: Bottom portion
14: Body portion
20: Mid piece part
21: Through hole
30: Outer piece part
31: Pin receiving hole
40: Pin
50: Watch bracelet

The invention claimed is:

1. An ornamental component having an ornamental face which has an arithmetic mean surface roughness Ra of less than or equal to 0.03 μm in a roughness curve, comprising a titanium nitride sintered body containing nickel and niobium, the titanium nitride sintered body containing a compound comprising nickel, niobium and titanium, the ornamental face having a lightness index L* of greater than or equal to 65 but less than or equal to 71, a chromaticness index a* of greater than or equal to 4 but less than or equal to 8, and a chromaticness index b* of greater than or equal to 4 but less than or equal to 20 according to CIE 1976 L*a*b* color space.

2. The ornamental component according to claim 1, wherein a content of free carbon is greater than or equal to 0.5 mass % but less than or equal to 1.2 mass % based on a total mass of all of constituents of the titanium nitride sintered body defined as 100 mass %.

3. The ornamental component according to claim 1, wherein the titanium nitride sintered body contains chromium, and contains a compound comprising nickel and chromium.

4. The ornamental component according to claim 1, wherein the titanium nitride sintered body contains at least one of molybdenum, tungsten and cobalt.

5. A watch, comprising the ornamental component according to claim 1.

6. A portable terminal, comprising the ornamental component according to claim 1.

7. A personal ornament, comprising the ornamental component according to claim 1.

* * * * *